United States Patent
Honda et al.

[11] Patent Number: 5,522,917
[45] Date of Patent: Jun. 4, 1996

[54] METHOD FOR DEAERATING LIQUID PRODUCTS

[75] Inventors: Katsuhisa Honda; Masazumi Yamashita, both of Matsuyama, Japan

[73] Assignee: Miura Co., Ltd., Ehime ken, Japan

[21] Appl. No.: 298,619

[22] Filed: Aug. 31, 1994

[30] Foreign Application Priority Data

Aug. 31, 1993 [JP] Japan .................... 5-240486

[51] Int. Cl.$^6$ ............................ B01D 61/00; B01D 19/00
[52] U.S. Cl. .................................... 95/46; 95/54; 96/6
[58] Field of Search ........................... 96/6, 155; 95/46, 95/54, 258, 263, 265, 241

[56] References Cited

U.S. PATENT DOCUMENTS

| | | | |
|---|---|---|---|
| 3,574,987 | 4/1971 | Skoli et al. | 96/199 |
| 4,268,279 | 5/1981 | Shindo et al. | 95/46 |
| 4,531,954 | 7/1985 | Klein | 96/6 |
| 4,729,773 | 3/1988 | Shirato et al. | 96/6 |
| 5,143,526 | 9/1992 | Lee et al. | 210/195.2 |

FOREIGN PATENT DOCUMENTS

| | | | |
|---|---|---|---|
| 54-23081 | 2/1979 | Japan | 95/46 |
| 63-302926 | 12/1988 | Japan | 96/6 |
| 3-118802 | 5/1991 | Japan | 95/46 |
| 4-118004 | 4/1992 | Japan | 95/46 |
| 4-171005 | 6/1992 | Japan | 95/46 |
| 4-267993 | 9/1992 | Japan | 95/46 |

*Primary Examiner*—Jay H. Woo
*Assistant Examiner*—Duane S. Smith

[57] ABSTRACT

A deaeration method for eliminating dissolved gases from a liquid product, which method involves low initial cost and running cost, compact equipment, and simple arrangement to accomplish the deaeration. For the method to eliminate dissolved gases from a liquid product, a deaeration module which is divided by a gas-pervious membrane into a liquid phase side and a vapor phase side is used. A deaeration-use gas composed of one or more kinds of inactive gases is previously dissolved in a liquid product to be deaerated, whereby a deaeration-target liquid is prepared. The deaeration-target liquid is distributed on the liquid phase side, in which distribution process the deaeration-use gas moves to the vapor phase side via the gas-pervious membrane, while the dissolved gases move to the vapor phase side along with the movement of the deaeration-use gas. This movement of the gases is carried out during passage through the deaeration module under ambient pressure.

9 Claims, 2 Drawing Sheets

METHOD FOR DEAERATING LIQUID PRODUCTS

BACKGROUND OF THE INVENTION

1. Field of the Invention

The present invention relates to a method for eliminating dissolved gases, especially dissolved oxygen, from liquid products that need to be deoxidized in terms of retention of product quality, such as foaming alcoholic drinks, carbonated drinks, or other like drinks, and medical supplies, and cosmetics.

2. Description of the Prior Art

As is well known, dissolved oxygen in a liquid is considered to be the main factor behind the oxidation. When the liquid itself is a product, the dissolved oxygen may cause components in the liquid to be deteriorated. When the liquid is designed for use of washing or like applications, the dissolved oxygen may cause the washing object to be oxidized. For example, in the case of liquors such as refined sake, wine, and distilled spirits, soft drinks, fruit drinks, and the like, there may occur deterioration in flavor, discoloration, and the like due to the effect of oxygen remaining dissolved in the drink. To prevent such phenomena, it is desirable to eliminate the dissolved gases including oxygen from the liquid product. Available methods for eliminating the dissolved gases are the aeration process (gas substitution process), the heat deaeration process, the chemical deaeration process, and the like.

Among the above-listed deaeration processes, the heat deaeration process is such that a liquid to be deaerated is heated in an open system whereby dissolved gases are discharged and eliminated. Accordingly, there is a possibility that oxygen may be redissolved in the liquid due to careless operation or malfunction of equipment. Further, the method cannot be applied to such liquids as may be deteriorated in quality by heat. As for the chemical deaeration process, since chemicals such as deoxidizing agents are used, the flavor of the product may be spoiled by the chemicals, and moreover safety concerns are involved. Thus, for liquid products as drinks such as mentioned above, the aeration process and the vacuum aeration process have been adopted.

In the aeration process (gas substitution process), a high-purity gas (e.g., nitrogen gas, carbon dioxide gas) other than oxygen is blown into a liquid to be deaerated within an aeration tank, so that the high-purity gas and the liquid are brought into direct contact with each other, whereby the oxygen partial pressure in the liquid is reduced. Thus, the dissolved oxygen is eliminated in a physical fashion.

The vacuum deaeration process is such that the atmosphere in contact with a liquid to be deaerated is evacuated by using a deaeration tower, so that gas partial pressure is reduced, whereby dissolved gases in the liquid are eliminated. In recent years, as one type of the vacuum deaeration process, the membrane type vacuum deaeration process has been put into practical use, in which a gas-permeable membrane (hydrophobic polymer membrane) that allows not water but only gas to pass therethrough is used and dissolved oxygen in the water is separated to a vapor phase under reduced pressure via the gas-permeable membrane.

However, as in foaming liquors such as beer and sparkling wine or in carbonated drinks, in the case of liquids that need to keep a particular gas (carbon dioxide gas in the above liquids) dissolved therein, the aforementioned vacuum deaeration process and heat deaeration process would cause not only dissolved oxygen but carbon dioxide gas, which is a crucial element in terms of flavor as such types of products, to be eliminated as well. As a result, there would arise the need of reading carbon dioxide gas later, which involves a high cost for carbon dioxide gas to be readed. Consequently, for the deaeration process for such types of liquids, the aeration process has been adopted to accomplish deoxidization by using carbon dioxide gas as the high-purity gas.

As stated above, in order to eliminate dissolved gases including oxygen from liquid products containing a particular gas, as in foaming liquors and carbonated drinks (carbon dioxide gas in these drinks), aeration using carbon dioxide gas has been applied. However, to reduce the concentration of dissolved gases in the liquid to low level, it is necessary to use an extremely high purity carbon dioxide gas. Besides, various measures should be taken, for example, foams of carbon dioxide gas to be blown into the liquid need to be sized as small as possible, so that the contact area between carbon dioxide gas and the liquid is maximized. Moreover, much time is taken. More specifically, for example, even if beer is aerated with carbon dioxide gas for 40 min, it is difficult to control the concentration of dissolved oxygen to not more than 1 ppm.

Further, due to structural restrictions in the aeration equipment, the aeration is performed under a pressure higher than liquid pressure. Therefore, high liquid pressure makes it difficult to eliminate dissolved gases, as another problem.

Besides, since the aeration process is performed in batch processing, a large amount of gas for aeration is necessitated. In addition, a large amount of foams is generated as a result of aeration, so that the aeration tank is reduced in its effective capacity. Therefore, a large-scale aeration tank is necessitated.

Still further, when beer is aerated, for example, with carbon dioxide gas in such a tank, foams of beer would go in the and out through the air vent in upper part of the aeration tank. This causes a possibility of bacterial poisoning from outside the tank, which is undesirable also from a hygienic point of view.

SUMMARY OF THE INVENTION

The present invention has been developed as a process which can solve the problems of the above-described aeration process and membrane-type vacuum aeration process and which has the advantages of both processes. Further, the present invention is directed to eliminating dissolved gases from liquid products with an apparatus which is low in cost, compact in size, and simple in construction.

The present invention, having been accomplished to solve the aforementioned problems, provides a deaeration process which combines the aeration process (gas substitution process) and the membrane-type vacuum deaeration process, and which can eliminate only target dissolved gases from liquid products by taking advantage of the difference in partial pressure between both sides of the gas-permeable membrane without using an aeration tank of large capacity or using vacuum suction means or the like.

In more detail, the present invention as a first aspect thereof provides a method for eliminating dissolved gases from a liquid product by using a deaeration module which has been divided into liquid phase and vapor phase sides by a gas-permeable membrane, the method comprising steps of: dissolving a deaeration-use gas, which is composed of one or more kinds of inactive gases, into a liquid product to be deaerated, whereby a deaeration-target liquid to be subjected to the aleaeration process is prepared; and distributing the deaeration-target liquid on the liquid phase side of the deaeration module in which distribution process the deaeration-use gas moves to the vapor phase side via the gas-permeable membrane while the dissolved gases also move to the vapor phase side along with the movement of the deaeration-use gas, wherein the movement of the gases is carried out during passage through the deaeration module. The present invention as a second aspect thereof provides a method for eliminating dissolved gases from a liquid product by using a deaeration module which has been divided into liquid phase and vapor phase sides by a gas-permeable membrane, the method comprising steps of: dissolving a deaeration-use gas, which is composed of one or more kinds of inactive gases, into a liquid product to be deaerated, whereby a deaeration-target liquid to be subjected to deaeration process is prepared; distributing the deaeration-target liquid on the liquid phase side of deaeration module, in which distribution process the deaeration-use gas moves to the vapor phase side via the gas-permeable membrane while the dissolved gases also move to the vapor phase side along with the movement of the deaeration-use gas, wherein the movement of the gases is carried out during passage through the deaeration module, whereby the aleaeration process is completed; recovering all the gases that have moved to the vapor phase side in the distribution process; eliminating the dissolved gases from the recovered gas to recover only the deaeration-use gas; and recycling the recovered deaeration-use gas. Further, the present invention as a third aspect thereof provides a method for eliminating dissolved gases from a liquid product by using a deaeration module which has been divided into liquid phase and vapor phase sides by a gas-permeable membrane, the method comprising steps of: utilizing an inactive gas originally contained in a liquid product to be deaerated; distributing the liquid product containing the inactive gas to the liquid phase side of the deaeration module, in which distribution process the inactive gas moves to the vapor phase side via the gas-permeable membrane while the dissolved gases also move to the vapor phase side along with the movement of the inactive gas, wherein the movement of the gases is carried out during passage through the deaeration module, whereby the deaeration process is completed; recovering all the gases that have moved to the vapor phase side in the distribution process; eliminating the dissolved gases from the recovered gas to recover only the inactive gas; and reading the recovered inactive gas to the liquid product over the deaeration process.

According to the first aspect of the present invention, a deaeration-use gas is initially dissolved into a liquid product to be deaerated, whereby a deaeration-target liquid to be subjected to deaeration process is prepared, and the deaeration-target liquid is distributed on the liquid phase side of the deaeration module. In this distribution process, the dissolved gases in the liquid product are entrapped by the deaeration-use gas, moving to the vapor phase side of the deaeration module along with the deaeration-use gas. By this movement, the deaeration process is completed. According to the second aspect of the present invention, all the gases that have moved to the vapor phase side in the distribution process are recovered, and the dissolved gases are eliminated from the recovered gas, whereby only the deaeration-use gas is recovered. The recovered deaeration-use gas is recycled as the gas to be initially dissolved in a liquid product. Further, according to the third aspect of the present invention, an inactive gas originally contained in a liquid product to be deaerated is used as the deaeration-use gas and, in the process in which the liquid product is distributed on the liquid phase side, gases dissolved in the liquid product are entrapped by the inactive gas, moving to the vapor phase side along with the inactive gas. By this movement, the deaeration process is completed. Meanwhile, all the gases that have moved to the vapor phase side in the distribution process are recovered, and the dissolved gases are eliminated from the recovered gas, whereby only the inactive gas is recovered. The recovered inactive gas is readed to the liquid product over the deaeration process.

DETAILED DESCRIPTION OF THE PREFERRED EMBODIMENTS

Figure 1:
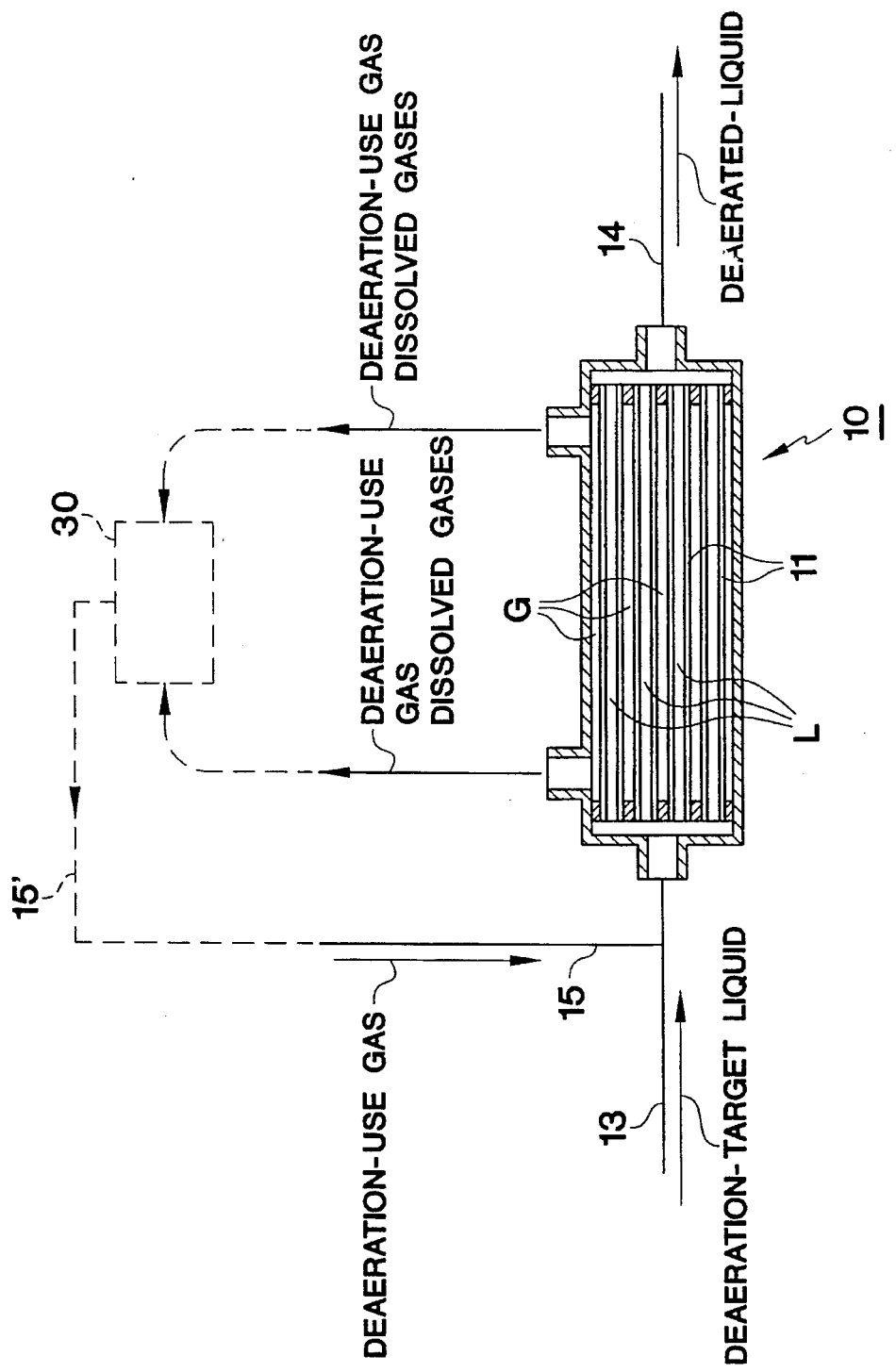
FIG. 1 is a schematic explanatory view showing an embodiment according to the present invention.

Hereinbelow, an embodiment of the present invention is described in detail.

First, among inactive gases, one or more kinds of suitable gases (inactive gases) that will not cause the components of a liquid product to be deaerated (hereinafter, referred to as a "source liquid") are selected and taken as a deaeration-use gas. The inactive gas herein used refers to a gas of poor reactivity, i.e., an inactive gas in its wide sense, including nitrogen, carbon dioxide (carbon dioxide gas), and the like as well as noble gases. Also, in obtaining the aleaeration-use gas, when only one kind of inactive gas is selected, it is used without any measures, and when several kinds of inactive gases are selected, they are previously mixed at a proper blending ratio.

Next, the deaeration-use gas is blown and dissolved into the source liquid, whereby a deaeration-target liquid to be deaerated is prepared. In this process, the deaeration-use gas is preferably dissolved into the source liquid to such a degree as to result in a supersaturated state. That is, the amount of the deaeration-use gas relative to the source liquid is such that an excess amount of deaeration-use gas as would result in a perfect dissolution state is blown into the source liquid with the result that part of the deaeration-use gas is formed into foams (the smaller, the more desirable).

One side of a gas-permeable membrane accommodated in a deaeration module provided by a proper container is taken as a discharge space of opened-to-air state (this side hereinafter referred to as "vapor phase side"). The deaeration-target liquid is distributed on the other side (this side hereinafter referred to as "liquid phase side").

Then, the deaeration-use gas present in the deaeration-target liquid in a supersaturated state is separated from the deaeration-target liquid as foams in the process of distribution on the liquid phase side of the gas-permeable membrane, moving to the vapor phase side by passing the gas-permeable membrane. Regarding the behavior of the deaeration-use gas in this process, the deaeration-use gas appears first as minute foams in the deaeration-target liquid, where around the resulting foams there are present other dissolved gases such as oxygen in addition to the deaeration-use gas. That is, the interior of these minute foams is almost all the deaeration-use gas, where the partial pressure of the dissolved gases is zero. In the process in which the foams appear and grow, gas movement is carried out at the interface between the foams and the deaeration-target liquid in such a way that the partial pressure ratio of gaseous components between both sides becomes uniform. Accordingly, the gases other than the deaeration-use gas, which are dissolved in the deaeration-target liquid, are entrapped in the foams of the deaeration-use gas and thereafter discharged into the discharge space on the vapor phase side along with the deaeration-use gas via the gas-permeable membrane.

Accordingly, the present invention is an improvement of the aeration process from a molecular viewpoint, the improvement making it possible to continuously perform the aeration process, which could not otherwise be carried out unless in batch processing. Moreover, the present invention allows the equipment involved to be compact, and the amount of gas used for aeration to be reduced substantially.

Now an arrangement example of a basic apparatus to which the present invention is applied is described with reference to FIG. 1.

Referring to FIG. 1, a deaeration module 10 has a gas-permeable membrane 11 of a hollow string or flat membrane shape or the like accommodated therein, as schematically illustrated in FIG. 1. By the gas-permeable membrane 11, the interior space of the deaeration module 10 is divided into a liquid phase side L where the deaeration-target liquid is distributed and a vapor phase side G taken as a discharge space of an opened-to-air state.

A supply line 13 for the source liquid is connected to one end of the liquid phase side L of the deaeration module 10, while a discharge line 14 for the target liquid over deaeration process is connected to the other end. The vapor phase side G is opened to air.

To the supply line 13 is connected a gas supply line 15 for supplying the deaeration-use gas, so that the deaeration-use gas is supplied into the source liquid through the gas supply line 15.

In the above arrangement, the deaeration-use gas is supplied from the gas supply line 15 to the supply line 13, so that the deaeration-use gas is blown into the source liquid until the deaeration-use gas is supersaturated. Thus, the deaeration-use gas is dissolved in the source liquid, whereby a deaeration-target liquid is prepared.

When the deaeration-target liquid in this state is supplied from the supply line 13 to the liquid phase side L in the deaeration module 10, the deaeration-use gas appears as foams from within the deaeration-target liquid during the process of passage through the liquid phase side L. Then in the process in which the foams are grown, other dissolved gases in the deaeration-target liquid are entrapped in the foams. Thereafter, the deaeration-use gas, in which the dissolved gases such as dissolved oxygen are entrapped, is discharged to the vapor phase side G, which is the discharge space, along with the dissolved gases via the gas-pervious membrane 11. By this process, the deaeration-target liquid is substantially deaeration treated, flowing into the discharge line 14 as treated liquid.

In the above description, the vapor phase side G of the gas-pervious membrane 11 is used as a discharge space of opened-to-air state, and dissolved gases such as dissolved oxygen are discharged into the air along with the deaeration-use gas. Optionally, the second feature of the present invention is that only the deaeration-use gas is recovered from among all the gases discharged from the vapor phase side G of the gas-pervious membrane 11 and the recovered deaeration-use gas is recycled to the target liquid through line 15.

For readdition of the deaeration-use gas, when it is effected to the source liquid before deaeration process, the amount of deaeration-use gas consumed can be further reduced.

When the deaeration process is executed by using a gas originally contained in the source liquid, or in the liquid product, as the deaeration-use gas, for example when carbon dioxide gas is used as the deaeration-use gas in liquid products containing carbon dioxide gas, as in beer or carbonated drinks, the recovered deaeration-use gas is readed to the liquid product over the deaeration process. In this case, since the liquid product (the aforementioned target liquid) over the deaeration process has dissolved gases such as dissolved oxygen eliminated therefrom as stated before, a larger amount of gas (carbon dioxide gas) than before the deaeration process may be added for the readdition.

Further, for recovering only the deaeration-use gas from all the gases discharged from the vapor phase side G of a gas-pervious membrane 11, it is also preferable that all the gases are distributed within a recovery container 30 in which a deoxidizing agent or the like is filled, so that only oxygen can be collected.

Next, with respect to the method of deaeration that is the second feature of the present invention, a more concrete application example is described in detail with reference to FIG. 2.

Figure 2:
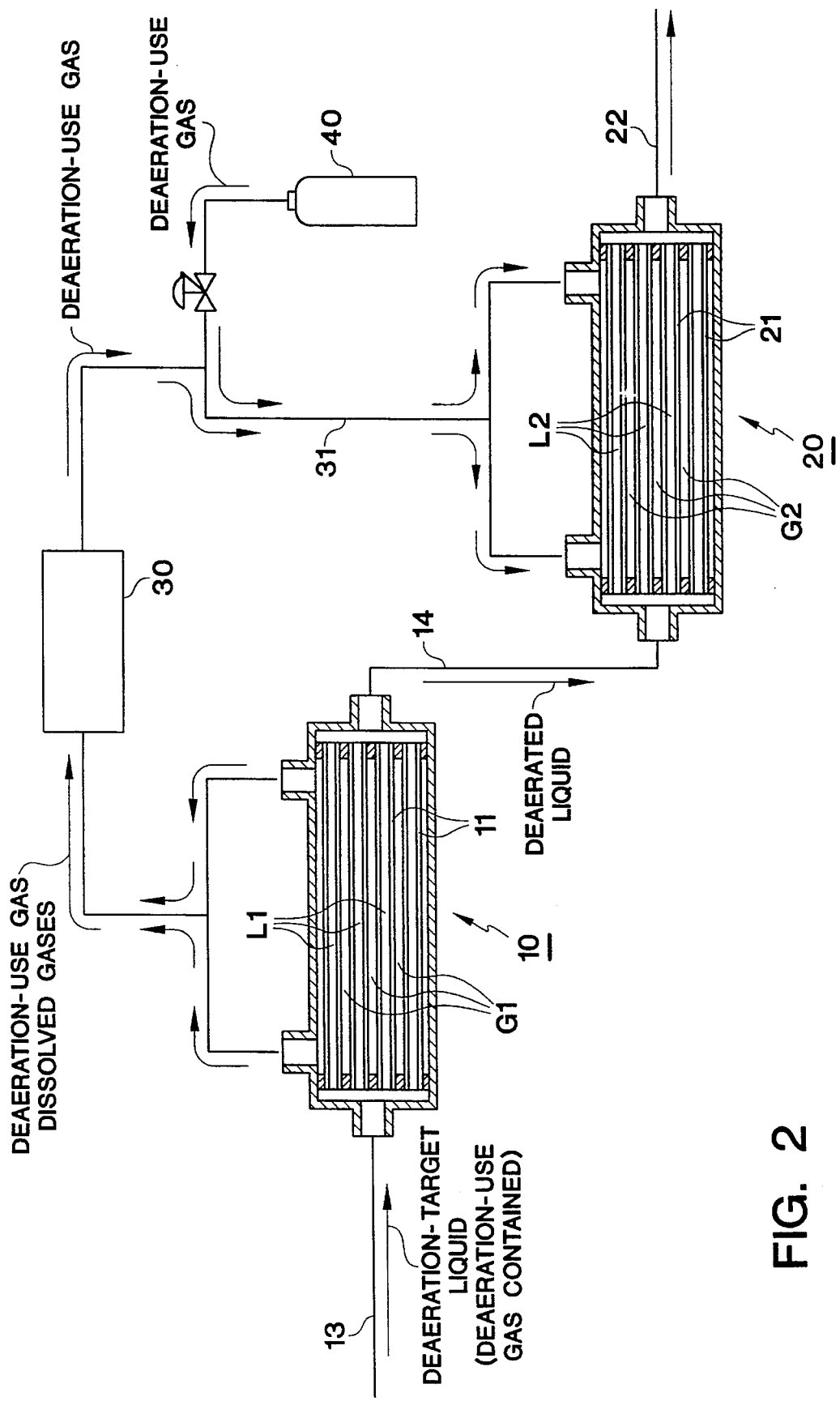
FIG. 2 is a schematic explanatory view showing another embodiment according to the present invention.

The embodiment of FIG. 2 shows a case where the deaeration-target liquid is beer as a liquid product containing carbon dioxide gas. In this embodiment, beer contains a large amount of carbon dioxide gas and yet in a supersaturated state. Accordingly, the carbon dioxide gas can be used as the deaeration-use gas and therefore, in this case, the operation of adding the deaeration-use gas can be omitted.

As is well known, beer source liquid just after fermentation (young beer) has oxygen consumed by yeast, such that virtually no dissolved oxygen is contained in the beer source liquid. However, in the later filtering process, oxygen is dissolved in the source liquid due to contact with the air or other reasons. For this reason, a deaeration process is provided between the filtering process and a later container-charging process.

For this aleaeration process, a deaeration module 10 similar to that described in the embodiment of FIG. 1 is arranged in the distribution path of beer, or the deaeration-target liquid. Besides, a gas-readdition module 20 having a construction similar to that of the deaeration module 10 is also arranged. In more detail, the deaeration module 10, as stated above, has a gas-permeable membrane 11 accommodated therein, and is divided in its interior space by the gas-permeable membrane 11 into a liquid phase side L1 where the deaeration-target liquid is distributed and a vapor phase side G1 where carbon dioxide gas or deaeration-use gas is discharged. Also, the gas-readdition module 20 has a gas-permeable membrane 21 accommodated therein, and is divided in its interior space by the gas-permeable membrane 21 into a liquid phase side L2 where the target liquid over deaeration process is distributed and a vapor phase side G2 where the gas to be readed (carbon dioxide gas) is distributed.

A supply line 13 for the deaeration-target liquid is connected to one end of the liquid phase side L1 of the deaeration module 10, while a discharge line 14 for the target liquid over deaeration process is connected to the other end. The vapor phase side G1 is connected to recovery equipment 30 for the deaeration-use gas.

The discharge line 14 is connected to one end of the liquid phase side L2 of the gas-readdition module 20, while a discharge line 22 for addition-treated liquid, to which gas has been readed, is connected to the other end. Further connected to the vapor phase side G2 is a readdition supply line 31 for the gas derived from the recovery equipment 30.

The recovery equipment 30 is only required to collect at least oxygen in this embodiment. Therefore, the recovery equipment 30 is arranged to contain, for example, a deoxidizing agent, an adsorbent, or the like.

The readdition supply line 31 has addition-use gas supply equipment 40 further connected thereto in parallel to the recovery equipment 30. In this case, the addition-use gas is of the same kind as the gas contained in the deaeration-target liquid and, since the deaeration-target liquid, i.e., the liquid product is beer in this embodiment, the addition-use gas supplied from the supply equipment 40 is carbon dioxide gas.

With the above arrangement, when the beer (aleaeration-target liquid) over the filtering process is supplied from the supply line 13 to the deaeration module 10, carbon dioxide gas as the deaeration-use gas is separated from the beer toward the vapor phase side G1 together with the dissolved gases including dissolved oxygen and the like, flowing into the recovery equipment 30, during the process of distribution through the liquid phase side L1 of the deaeration module 10. Meanwhile, the beer is substantially deaerated at the point-in-time when it has passed the deaeration module 10. Then the beer flows from the discharge line 14 into the gas-readdition module 20 as treated liquid.

The gas-readdition module 20 has the deaerated beer flow into its liquid phase side L2 while it has gases (mostly carbon dioxide gas in this embodiment), from which at least oxygen has been eliminated by the recovery equipment 30, flow into its vapor phase side G2. In this process, carbon dioxide gas, which is the addition-use gas, is supplied from the supply equipment 40 to the liquid phase side L2 of the gas-readdition module 20 via the readdition supply line 31.

As a result, carbon dioxide gas on the vapor phase side G2 is dissolved into the beer distributing on the liquid phase side L2, converse to the aforementioned deaeration process. Then, the beer, to which carbon dioxide gas has been readed, flows into the discharge line 22 as addition-treated liquid. Accordingly, the beer that has been subjected to the deaeration process and the carbon dioxide gas readdition process is prevented from deterioration in its flavor due to dissolved oxygen in the later processes and the distribution processes after factory shipping.

As stated above, according to the present embodiment, the amount of carbon dioxide gas consumed in the deaeration process is greatly reduced as compared to the conventional aleaeration process in which carbon dioxide gas is aerated. Also, the conventional deaeration process by aeration necessitates large-scale aeration equipment and the deaeration process cannot be accomplished unless by batch processing. However, according to the present embodiment, as stated above, the deaeration process can be accomplished with relatively simple, small-sized equipment and in continuous fashion.

The conventional aeration process and the method according to the present embodiment were actually compared with respect to the amount of carbon dioxide gas consumed when beer was deaerated to similar level. As a result, the conventional aeration process showed a carbon dioxide gas consumption of 350 liters for every 1 kiloliters of beer, while the present embodiment showed a consumption of 36 to 44 liters, which means a sharp drop to about ⅛ to ⅒ of the conventional process.

Further, it is arranged that the deaeration-use gas eliminated from the liquid product is readed after dissolved oxygen is eliminated by the recovery equipment 30. Accordingly, the amount of carbon dioxide gas used can be further reduced to the order of some one-digit percent relative to the conventional aeration process.

In the foregoing description, application examples of the present invention have been described in conjunction with concrete embodiments. However, the present invention is not limited to the above-described application examples, but may easily and simply be applied to production lines for liquors such as foaming wines and distilled spirits, other carbonated drinks, liquid dressings such as soy sauce, liquid products such as cosmetics as well as condensed source liquids as their material liquids, diluting water, and the like.

As described above, according to the present invention, a deaeration-target liquid having a deaeration-use gas contained therein in a supersaturated state is distributed to the liquid phase side of the deaeration module, whereby deaeration process is accomplished by making use of differing partial pressures of gaseous components. As a result, the deaeration process for liquid products, which has so far been dependent only on the aeration process, clan be accomplished with very simple, small-sized construction and in continuous fashion.

Also, the conventional aeration process has involved large amounts of high purity gas (or gas of specified composition) being consumed. However, according to the present invention, the consumption amount can be reduced substantially, and therefore the running cost can be also reduced.

Besides, according to the present invention, the deaeration-use gas (carbon dioxide gas and the like) can be recovered and recycled. Accordingly, its consumption amount can be further reduced, which contributes much to reduction in the running cost.

Further, even if the liquid product itself contains a specified deaeration-use gas, it is possible to eliminate virtually only dissolved oxygen by reading the deaeration-use gas.

Furthermore, the contact area between the liquid phase side and the vapor phase side can be increased by virtue of the action of the gas-permeable membrane, as compared with the conventional aeration process. Accordingly, a high deaeration efficiency can be attained, which is very advantageous as this type of deaeration process.

What is claimed is:

1. A method for deaerating liquid products, comprising:

providing a deaeration module which is a vessel divided into liquid phase and vapor phase sides by a gas-permeable membrane;

dissolving a deaeration gas, comprising at least one non-reactive gas, by flowing said deaeration gas through a gas supply line into a liquid product to be deaerated, to form a deaeration-target liquid;

flowing said deaeration-target liquid into the liquid phase side of said deaeration module, wherein the deaeration gas combines with any dissolved gases to be removed from the liquid product, and said combined gases permeate through the gas-permeable membrane into the vapor phase side of said deaeration module, under ambient pressure; and removing the deaerated liquid product from the deaeration module.

2. The method according to claim 1, wherein the dissolved gas to be removed is oxygen.

3. The method according to claim 2, further comprising recovering said combined gases.

4. The method according to claim 3, further comprising flowing said combined gases into a recovery vessel containing a deoxidizing agent, so as to separate the oxygen gas from the recovered deaerating gas.

5. The method according to claim 4, further comprising returning said recovered deaerating gas to said gas supply line.

6. A method for deaerating liquid products, comprising:

providing a deaeration module which is a vessel divided into liquid phase and vapor phase sides by a gas-permeable membrane;

dissolving a deaeration gas, comprising at least one non-reactive gas, by flowing said deaeration gas through a gas supply line into a liquid product to be deaerated, to form a deaeration-target liquid;

flowing said deaeration-target liquid into the liquid phase side of said deaeration module, wherein the deaeration gas combines with dissolved oxygen to be removed from the liquid product, and said combined gases permeate through the gas permeable membrane into the vapor phase side of said deaeration module, under ambient pressure;

recovering said combined gases by flowing them into a recovery vessel containing a deoxidizing agent so as to remove oxygen from the recovered deaerating gas;

returning the recovered deaerating gas to said gas supply line; and removing the deaerated liquid product from the deaeration module.

7. A method for deaerating liquid products, comprising:

providing a deaeration module which is a vessel divided into liquid phase and vapor phase sides by a gas-permeable membrane;

dissolving a deaeration gas, comprising at least one non-reactive gas identical to a non-reactive gas already dissolved in a liquid product, by flowing said deaeration gas through a gas supply line into said liquid product to be deaerated, to form a deaeration-target liquid;

flowing said deaeration-target liquid into the liquid phase side of said deaeration module, wherein the deaeration gas combines with any dissolved gasses to be removed from the liquid product, and said combined gases permeate through the gas-permeable membrane into the vapor phase side of said deaeration module, under ambient pressure;

recovering said combined gases by flowing them into a recovery vessel containing a deoxidizing agent so as to remove oxygen from the recovered deaerating gas;

removing the deaerated liquid product from the deaeration module;

flowing the deaerated liquid product and the recovered deaerating gas into a gas readdition module;

redissolving at least a portion of said recovered deaerating gas in said liquid product; and removing said liquid product from said gas readdition module.

8. The method according to claim 7, wherein said gas readdition module comprises a vessel which is divided into liquid phase and gas phase sides by a gas-permeable membrane.

9. The method according to claim 7, further comprising adding an additional amount of said deaerating gas to said liquid product during said dissolving step.

* * * * *